United States Patent [19]

Iwata

[11] 3,840,774

[45] Oct. 8, 1974

[54] MAGNETRON OPERATING CIRCUIT WITH SURGE-VOLTAGE ABSORBER

[75] Inventor: Kozo Iwata, Kyoto, Japan

[73] Assignee: New Nippon Electric Company Ltd., Osaka, Japan

[22] Filed: Feb. 15, 1973

[21] Appl. No.: 332,556

[30] Foreign Application Priority Data

Feb. 22, 1972 Japan.............................. 47-18341

[52] U.S. Cl.............. 315/39.51, 315/201, 328/259
[51] Int. Cl. ........................................ H01j 25/50
[58] Field of Search.............. 315/36.97, 39.51, 105, 315/201; 331/62, 86; 317/33 C, 50, 52, 61.5; 330/47, 207 P; 332/5; 328/9, 259, 262

[56] References Cited
UNITED STATES PATENTS

| | | | |
|---|---|---|---|
| 3,396,342 | 8/1968 | Feinberg............................ | 328/262 |
| 3,651,371 | 3/1972 | Tingley............................ | 331/86 X |

*Primary Examiner*—Herman Karl Saalbach
*Assistant Examiner*—James B. Mullins
*Attorney, Agent, or Firm*—W. G. Fasse

[57] ABSTRACT

In an operating circuit for energizing a magnetron by the use of a high-voltage transformer, a surge-voltage absorber is provided to protect components in the high-voltage circuit from the damage due to abnormal voltage induced in the high-voltage transformer particularly during the unstable operation of the magnetron such as warming-up time. The operating circuit includes a high voltage transformer, preferably of constant current type having the primary winding coupled to an A.C. source and the secondary winding coupled in parallel to a uni-directional conducting device, and both of the magnetron and the surge-voltage absorber.

The surge-voltage absorber comprises charging and discharging means consisted of a capacitor and a resistor, and a series connected rectifier of which the polarity is the same with that of the magnetron. Preferably, the uni-directional conducting device is a half-wave rectifier being poled oppositely to the surge-voltage absorber and a capacitor in series to the secondary winding so as to absorb the abnormal voltages mainly produced in the warm-up period of the magnetron.

14 Claims, 3 Drawing Figures

PATENTED OCT 8 1974　　　　　　　　　　　　　　　3,840,774

MAGNETRON OPERATING CIRCUIT WITH SURGE-VOLTAGE ABSORBER

BACKGROUND OF THE INVENTION

1. Field of the Invention

This invention relates to a magnetron device operated by the output voltage from a high-voltage transformer, and more particularly is concerned with a power supply circuit for operating magnetron which is suitably employed in high-frequency heating apparatus such as a electronic oven.

2. Description of the Prior Art

A conventional operating circuit for a magnetron having fixed permanent magnets employed in a high-frequency heating oven uses a high-voltage transformer of the leakage type to provide a constant current to the magnetron regardless of variations of the source voltage, in which the secondary winding is coupled through a series capacitor to a half-wave rectifier as disclosed in the specification of the U.S. Pat. No. 3,396,342. In the above circuit, the impedance value due to the capacitance of the series capacitor and the reactance of the transformer is utilized for forming a by-pass circuit for the magnetron during the half-cycle of operating the half-wave rectifier circuit. On the other hand, there are two system for igniting the magnetron device, one of which systems is to apply the plate voltage for the magnetron after passing a certain time, for instance several seconds, when the heating voltage for the magnetron is supplied to warm up thereof, and the other system is to apply the anode voltage as the same time with the heating voltage. The former or the pre-heat type requires two separate transformer circuits for the plate and heater voltage sources and the use of different driving means such as two switches, whereas the latter or the simultaneous driving system simplifies the circuit for energizing the magnetron by the use of a single switch and the common primary winding of the high-voltage transformer for the heating winding.

The simultaneous driving system, however, produces a relatively large abnormal voltages as a spike or surge voltage with pulse-shaped waveform of which the peak voltage reaches to about three times the normal plate voltage being an approximate value of 4,000 volts. Thus, the circuit components in the high-voltage circuit are exposed frequently to the surge voltages, and reach to the breakdown or inoperable state.

As a countermeasure to such problems, the following is considered;

1. The use of circuit components having a higher voltage-withstanding against the undesired surge voltages.
2. The use of the high-voltage circuit substantially free of surge voltage.
3. The use of an surge-voltage absorber for the high voltage circuit.

The first way has the disadvantage that it makes the circuit expensive, and in the second way problems may be lightened by the use of the full-wave rectifier circuit, but not provide the complete resolution. It is also difficult to apply the half-wave rectifier circuit.

Accordingly, the third way of the resolusion is utilized effectively, particularly to the operating circuit using the simultaneous driving system and the half-wave rectifier circuit.

SUMMARY OF THE INVENTION

An object of the invention is to provide a power supplying circuit for magnetron devices, which has means of protecting the circuit components by suppressing the undesired surge voltages.

Another object of this invention is to provide an surge-voltage absorber used in the high voltage circuit so as to reduce the rated voltage of components and to prevent accidental damages. Still another object is to provide an economical operating circuit for magnetron energizing it by a half-wave rectifier circuit and under the simultaneous driving system for the anode and heater voltages in the magnetron.

According to this invention, there is provided a magnetron operating circuit having a leakage transformer of which the primary winding is connected to an A.C. power source through a suitable power switch and the secondary winding is preferably connected to a half-wave rectifier and to a magnetron in the relation of the reversing polality each other, wherein surge-voltage absorber including a charging and discharging circuit and a rectifier poled reversely to the half-wave rectifier is added. In other words, a series circuit of a rectifier and a by-pass capacitor with a discharging resistor is coupled in parallel relation with the magnetron so as to absorb abnormal voltages induced within the high voltage circuit during operation of the magnetron. It is necessary that the charging and discharging circuit must be established under its abilities sufficient to charge and discharge the surge voltage, for example, the values of the by-pass capacitor is 0.1 microfarad or more, and the discharging resistor is about 10 megaohms.

It is believed that the spike or surge voltage is induced in accordance with transient phenomena such as chattering of the switch or starting of the magnetron, and that resonant circuit formed by the reactance of the transformer and the capacitance of the fixed capacitor and/or the stray capacitance in the power supplying circuit. In my experiment, surge voltages are appeared significantly at the time when the switch is closed and after passing a few seconds from the start of magnetron operation. It has been found that the surge voltage produced from the magnetron in its unstable operation is an important problem, because such surge voltage having large magnitudes is harmful.

It may be possible to suppress the surge voltage by the use of a variable resistor having small resistance against high voltage or an avalanche diode, but such elements are not satisfactory to absorbing effect. In this connection, the circuit of the invention is significant and practical.

There is another advantage of this invention that some components can be used common, for instance, the high-voltage transformer in the operating circuit for a pair of magnetrons energizing each one by the respective half-wave rectifier. Another important advantage of this invention is to provide an inexpensive operating circuit by the use of a leakage transformer having two secondary windings for the heater electrode and the plate electrode of the magnetron.

DETAIL DESCRIPTION OF THE EMBODIMENTS

Figure 1:
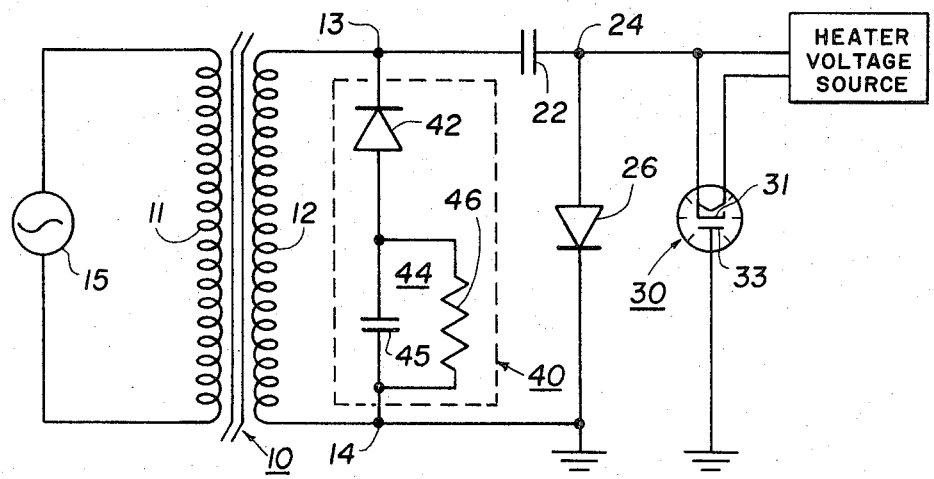
FIG. 1 is a principle circuit diagram of an embodiment of this invention.

As shown in FIG. 1, the primary winding 11 of high-voltage transformer 10 of the leakage type is connected across an A.C. power source 15 and to one terminal 13 of the secondary winding 12 of the high-voltage transformer 10 is connected through a capacitor 22 a junction 24 to which both of the anode electrode of a half-wave diode rectifier 26 and the cathode electrode 31 of a magnetron 30 are connected. The terminal 13 also connects the negative terminal of a surge-voltage absorber 40 of this invention which comprises a diode 42 and a charging-discharging circuit 44 including a by-pass capacitor 45 and a discharging resistor 46, and the positive terminal thereof is at ground potential as well as the other terminal 14 of the high-voltage transformer 10. Also, the cathode electrode of the half-wave diode rectifier 26 and the anode electrode 33 of the magnetron 30 are kept at ground potential.

In operation of the above circuit, since the half-wave rectifier 26 is poled oppositely to the magnetron 30, when the junction 24 is negative, current cannot flow through the rectifier 26 but can flow through the magnetron 30. When, on alternate half-cycles, the junction 24 is positive, current cannot flow through the magnetron 30. On such half-cycles, current freely flows through the rectifier 26, by-passing the magnetron 30. During the starting period of the magnetron 30, however, current through the magnetron 30 is frequently obstructed in its unstable state, though the junction 24 is negative. Thus, an abnormal voltage of the pulse-shaped spike or surge voltage is induced within the circuit. Against such abnormal voltage, the surge voltage absorber 40 is provided in a manner of the reverse connection with the half-wave rectifier 26.

When the polarity of abnormal voltage at the terminal 13 of the secondary winding 12 of the transformer 10 is positive, the peak voltage is charged to the capacitor 22, and when the polarity is reversed, abnormal voltage is charged to the by-pass capacitor 45 through the diode 42, so that the damage of the magnetron due to such peak voltage can be eliminated for each half-cycles. In case that when the negative terminal of the surge-voltage absorber 40 is connected to the junction 24, the same effect can be obtained, though the potential at the junction 24 becomes higher than the terminal 13 of the secondary winding 12.

Figure 2:
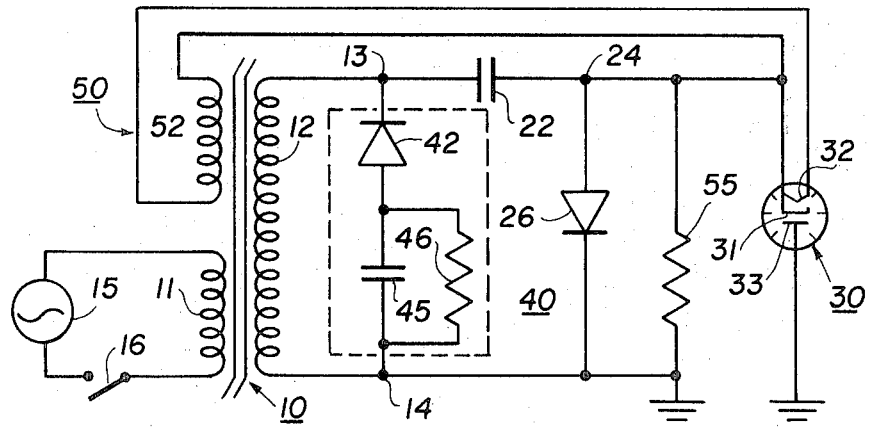
FIG. 2 is a circuit diagram of another embodiment of this invention in which the primary winding of the transformer is used in common.

FIG. 2 shows another embodiment in which the secondary winding 52 for the filament 32 of cathode 31 of the magnetron 30 is added to the high-voltage transformer 10 so that the simple circuit operated on the basis of half-wave rectification is achieved. The same reference numbers are indicated, but the followings are also used in FIG. 2.

In the circuit of FIG. 2, a main switch 16 is connected between one terminal of the primary winding 11 and the power source 15 for driving the high voltage circuit as same as the heating circuit 50 for the magnetron 30, which comprises a third winding 52 for heating voltage and means for connecting the winding 52 across the filament 32 of the magnetron 30. Further, a resistor 55 is connected across the half-wave rectifier circuit 26 for discharging stray electric charges, which remains after openning the main switch 16.

Figure 3:
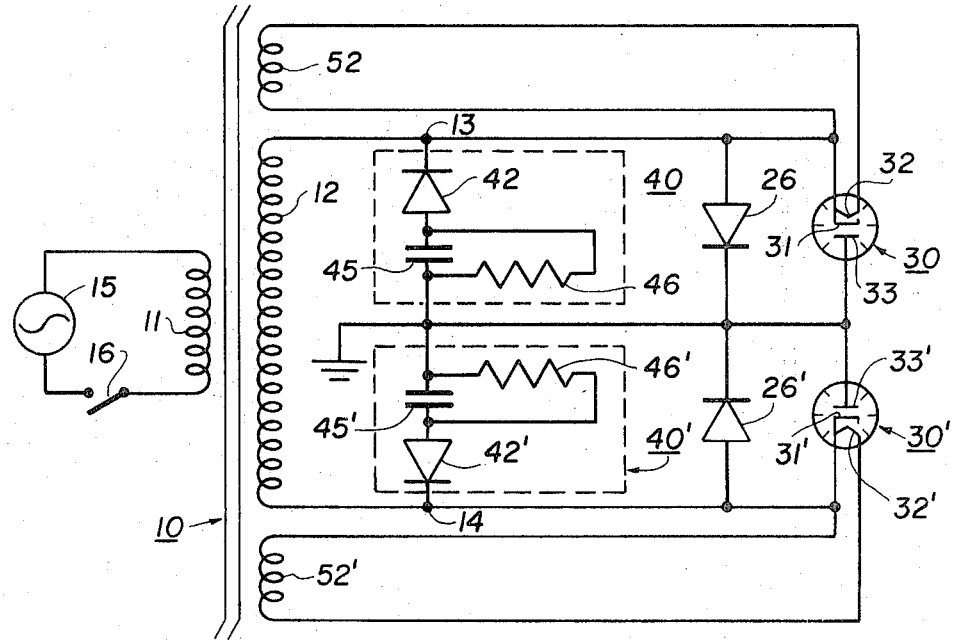
FIG. 3 is a circuit diagram of still another embodiment of this invention, in which a pair of magnetrons are alternately operated.

This invention is not limited to circuits in which there is only one magnetron, but is applicable to multiple magnetron circuits, either where the magnetrons are in use in the same or different locations. For example, one power supply transformer can operate two magnetron by the use of two half-wave rectifiers operated each other, and such embodiment is shown in FIG. 3, wherein two magnetron 30 and 30' in the reverse-series relation are connected across terminals 13 and 14 of the secondary winding 12 of the single high-voltage transformer 10. There are pairs of half-wave rectifiers 26 and 26' and surge-voltage absorber 40 and 40' connected in parallel-reverse connection each others. One terminal of these components 26, 26', 30, 30', 40 and 40' are common at ground potential.

The operation of the circuit of FIG. 3 is similar to that of FIG. 2, except in this case, the capacitor 22 may be removed because the use of a couple of circuits. The discharging resistor 55 in FIG. 2 is also removed because the rectifiers operate each other in each half-cycles.

What is claimed is:

1. An operating circuit for energizing a magnetron from an a.c. power source which comprises:
    a. a magnetron having an anode and a cathode,
    b. a high voltage transformer having a primary winding connected to said a.c. power source and a secondary winding connected to said magnetron,
    c. a uni-directional conducting device coupled to said magnetron and poled oppositely to said magnetron so as to allow the flow of current through the magnetron for alternate half-cycles of said a.c. power source, and
    d. a surge-voltage absorber connected in the parallel relation with said magnetron and comprising a series circuit of a rectifier and charging-discharging means, wherein said absorber serves to protect components of the high voltage operating circuit from abnormal voltage produced therein.

2. The operating circuit as claimed in claim 1, wherein said charging-discharging means is a parallel circuit of a by-pass capacitor and a discharging resistor.

3. The operating circuit as claimed in claim 2, wherein said uni-directional conducting device is a half-wave rectifier, and further comprising a series capacitor connected between one terminal of said secondary winding and one electrode of said half-wave rectifier.

4. The operating circuit as claimed in claim 3, wherein said high voltage transformer is a leakage transformer so that the magnetron operates with a constant current.

5. The magnetron operating circuit as claimed in claim 3, wherein said surge-voltage absorber is connected across the terminals of said secondary winding of said high-voltage transformer, whereby the rated maximum withstanding voltage of said absorber is reduced.

6. The operating circuit as claimed in claim 1, further comprising a resistor connected across said uni-directional conducting device so as to discharge electric charges remaining in the operating circuits.

7. A magnetron operating circuit comprising:
a. an a.c. power source, and a power switch,
b. a magnetron having an anode electrode and a cathode electrode with a filament,
c. a high voltage transformer having a primary winding connected to said a.c. power source through the power switch, a secondary winding for high operating voltage connected to said magnetron and a third winding for heating voltage connected to the filament of said magnetron,
d. a half-wave rectifier connected to said secondary winding through a capacitor and coupled in reversed-parallel connection with said magnetron, and a surge-voltage absorber comprising a rectifying diode and a capacitor with a parallel resistor and coupled in parallel relation with said magnetron so as to absorb abnormal voltage appearing with the same polarity in said magnetron, whereby the magnetron can be energized upon closing of said power switch.

8. The magnetron operating circuit as claimed in claim 7, wherein said surge-voltage absorber is connected across the terminals of said secondary winding of said high-voltage transformer.

9. The magnetron operating circuit as claimed in claim 7, further comprising a resistor connected across said half-wave rectifier so as to discharge electric charges remaining in the operating circuit.

10. A magnetron operating circuit comprising:
a. an a.c. power source,
b. a pair of magnetrons each having an anode and a cathode with a filament, a first pair of like electrodes being interconnected,
c. a high voltage transformer having a primary winding connected to said a.c. power source and a secondary winding connected between the other like electrodes of said pair of magnetrons,
d. a first and second half-wave rectifier connected in parallel with separate magnetrons in a manner that each magnetron is operated by alternate half-cycles of said a.c. power source, and a pair of surge-voltage absorbers, each of said absorbers comprising a rectifier diode connected in series with a parallel circuit of a capacitor and resistor, and said absorbers being connected in reverse parallel connection with separate half-wave rectifiers, whereby the circuit can operate two magnetrons.

11. The magnetron operating circuit as claimed in claim 10, wherein said high voltage transformer is a leakage transformer so as to obtain constant current operation.

12. The magnetron operating circuit as claimed in claim 10, said high voltage transformer has further a pair of third windings, each of which is connected to said filament of a separate magnetron.

13. A magnetron operating circuit for energizing a magnetron from an a.c. source, comprising:
a. a magnetron having an anode and a cathode,
b. a high voltage transformer having a primary winding adapted to be connected to said a.c. source, and a secondary winding,
c. a first capacitor,
d. means connecting said first capacitor and secondary winding in series between the cathode and anode of said magnetron in that order,
e. a first rectifier having an anode connected to the cathode of said magnetron, and a cathode connected to the anode of said magnetron,
f. and a surge voltage absorber coupled in parallel with said secondary winding, said surge voltage absorber comprising the series connection of a second rectifier with the parallel circuit of a second capacitor and a resistor, said second rectifier being poled with its cathode connected to the junction of said first capacitor and secondary winding.

14. The magnetron operating circuit of claim 13, wherein said transformer is a leakage transformer.

* * * * *